(12) United States Patent
Gooding et al.

(10) Patent No.: US 8,799,696 B2
(45) Date of Patent: *Aug. 5, 2014

(54) ADAPTIVE RECOVERY FOR PARALLEL REACTIVE POWER THROTTLING

(71) Applicant: International Business Machines Corporation, Armonk, NY (US)

(72) Inventors: Thomas M. Gooding, Rochester, MN (US); Brant L. Knudson, Rochester, MN (US); Cory Lappi, Rochester, MN (US); Ruth J. Poole, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,882

(22) Filed: Dec. 6, 2012

(65) Prior Publication Data

US 2013/0159744 A1 Jun. 20, 2013

Related U.S. Application Data

(63) Continuation of application No. 13/327,100, filed on Dec. 15, 2011.

(51) Int. Cl.
*G06F 1/32* (2006.01)

(52) U.S. Cl.
USPC ........... 713/324; 713/320; 713/323; 710/260; 710/267

(58) Field of Classification Search
USPC ........................................................ 713/324
See application file for complete search history.

(56) References Cited

U.S. PATENT DOCUMENTS

| | | | | |
|---|---|---|---|---|
| 6,535,798 | B1 * | 3/2003 | Bhatia et al. | 700/293 |
| 6,574,740 | B1 * | 6/2003 | Odaohhara et al. | 713/323 |
| 6,836,849 | B2 * | 12/2004 | Brock et al. | 713/310 |
| 7,069,189 | B2 * | 6/2006 | Rotem | 702/189 |
| 7,155,625 | B2 * | 12/2006 | Cohen et al. | 713/340 |
| 7,194,641 | B2 * | 3/2007 | Hack | 713/300 |
| 7,386,414 | B2 * | 6/2008 | Aguilar et al. | 702/130 |
| 7,464,276 | B2 * | 12/2008 | Rusu et al. | 713/300 |
| 7,480,586 | B2 * | 1/2009 | Johns et al. | 702/130 |

(Continued)

OTHER PUBLICATIONS

IBM TDB, Distributed Power/Thermal Monitoring and Control in Large Computer Systems, IP.com Prior Art Database: Technical Disclosure, Dec. 1, 2004, vol. 37, No. 12, Internal Business Machines Corporation, Armonk, New York, United States.

(Continued)

*Primary Examiner* — Ryan Stiglic
(74) *Attorney, Agent, or Firm* — Patterson & Sheridan LLP

(57) ABSTRACT

Power throttling may be used to conserve power and reduce heat in a parallel computing environment. Compute nodes in the parallel computing environment may be organized into groups based on, for example, whether they execute tasks of the same job or receive power from the same converter. Once one of compute nodes in the group detects that a parameter (i.e., temperature, current, power consumption, etc.) has exceeded a first threshold, power throttling on all the nodes in the group may be activated. However, before deactivating power throttling, a plurality of parameters associated with the group of compute nodes may be monitored to ensure they are all below a second threshold. If so, the power throttling for all of the compute nodes is deactivated.

10 Claims, 7 Drawing Sheets

(56) References Cited

U.S. PATENT DOCUMENTS

| | | | |
|---|---|---|---|
| 7,502,948 B2 * | 3/2009 | Rotem et al. | 713/300 |
| 7,581,125 B2 * | 8/2009 | Ranganathan et al. | 713/320 |
| 7,613,935 B2 * | 11/2009 | Schumacher et al. | 713/300 |
| 7,617,406 B2 * | 11/2009 | Yasuo | 713/320 |
| 7,647,516 B2 * | 1/2010 | Ranganathan et al. | 713/320 |
| 7,702,938 B2 * | 4/2010 | Ha | 713/323 |
| 7,702,965 B1 | 4/2010 | Planki et al. | |
| 7,721,128 B2 * | 5/2010 | Johns et al. | 713/322 |
| 7,747,407 B2 * | 6/2010 | Johns et al. | 702/130 |
| 7,848,901 B2 * | 12/2010 | Johns et al. | 702/130 |
| 7,877,620 B2 * | 1/2011 | Gara et al. | 713/320 |
| 7,953,957 B2 * | 5/2011 | Gooding et al. | 712/28 |
| 7,957,848 B2 * | 6/2011 | Johns et al. | 700/299 |
| 7,975,156 B2 * | 7/2011 | Artman et al. | 713/323 |
| 8,037,893 B2 * | 10/2011 | Aguilar et al. | 137/12 |
| 8,064,197 B2 * | 11/2011 | Mowry et al. | 361/679.53 |
| 8,108,703 B2 * | 1/2012 | Bahali et al. | 713/320 |
| 8,140,879 B2 * | 3/2012 | Chueh et al. | 713/340 |
| 8,195,970 B2 * | 6/2012 | Artman et al. | 713/323 |
| 8,386,824 B2 * | 2/2013 | Artman et al. | 713/323 |
| 8,510,582 B2 * | 8/2013 | Naffziger et al. | 713/323 |
| 2003/0110012 A1 * | 6/2003 | Orenstien et al. | 702/188 |
| 2004/0128663 A1 * | 7/2004 | Rotem | 717/161 |
| 2004/0148528 A1 * | 7/2004 | Silvester | 713/300 |
| 2005/0049729 A1 * | 3/2005 | Culbert et al. | 700/50 |
| 2005/0050373 A1 * | 3/2005 | Orenstien et al. | 713/320 |
| 2006/0149975 A1 * | 7/2006 | Rotem et al. | 713/300 |
| 2006/0259793 A1 * | 11/2006 | Moore et al. | 713/300 |
| 2006/0288243 A1 * | 12/2006 | Kim | 713/300 |
| 2007/0121492 A1 * | 5/2007 | Johns et al. | 370/223 |
| 2007/0156370 A1 * | 7/2007 | White et al. | 702/132 |
| 2007/0186121 A1 * | 8/2007 | Yasuo | 713/320 |
| 2008/0005591 A1 * | 1/2008 | Trautman et al. | 713/300 |
| 2008/0123238 A1 | 5/2008 | Campos et al. | |
| 2008/0267258 A1 | 10/2008 | Hokenmaier | |
| 2009/0049317 A1 * | 2/2009 | Gara et al. | 713/320 |
| 2009/0153109 A1 * | 6/2009 | Koertzen et al. | 323/268 |
| 2009/0230769 A1 * | 9/2009 | Aerts | 307/32 |
| 2010/0100254 A1 * | 4/2010 | Artman et al. | 700/299 |
| 2010/0296238 A1 * | 11/2010 | Mowry et al. | 361/679.53 |
| 2011/0239025 A1 * | 9/2011 | Artman et al. | 713/323 |
| 2012/0023345 A1 * | 1/2012 | Naffziger et al. | 713/320 |
| 2012/0221872 A1 * | 8/2012 | Artman et al. | 713/320 |

OTHER PUBLICATIONS

Steele, Jerry, ACPI Thermal Sensing and Control in the PC., Wescon/98, 1998, pp. 169-182, IEEE, Piscataway, New Jersey, United States.

LM78: Microprocessor System Hardware Monitor, National Semiconductor, Mar. 1998, Santa Clara, California, United States.

Cisco Systems, Inc., Cisco 7000, Cisco 7000 Hardware Installation and Maintenance, 1993-1995, 2001, Cisco Systems, Inc., San Jose, California, United States.

Standard Microsystems Corporation, MON35W82: Hardware Monitoring IC-I2C Interface Only, Jan. 12, 1999, Standard Microsystems Corporation, Hauppauge, New York, United States.

Gooding et al.: "Adaptive Recovery for Parallel Reactive Power Throttling", U.S. Appl. No. 13/327,100, filed Dec. 15, 2011.

* cited by examiner

ADAPTIVE RECOVERY FOR PARALLEL REACTIVE POWER THROTTLING

CROSS-REFERENCED TO RELATED APPLICATIONS

This application is a continuation of co-pending U.S. patent application Ser. No. 13/327,100, filed Dec. 15, 2011. The aforementioned related patent application is herein incorporated by reference in its entirety.

BACKGROUND

1. Field of the Invention

The present invention generally relates to processing data in a parallel computing environment, or, more specifically, to managing power or temperature in the parallel computing environment.

2. Description of Related Art

Parallel computing is the simultaneous execution of the same task (split up and specially adapted) on multiple processors in order to obtain results faster. Parallel computing benefits from the fact that a process can usually be divided into smaller tasks, which may be performed simultaneously.

Parallel computers execute parallel algorithms. A parallel algorithm (i.e., a job) can be split up into tasks that are executed on different processing devices. The results from the plurality of tasks may then be combined to yield the overall result. Some jobs are easy to divide up into tasks; for example, a job that checks all of the numbers from one to a hundred thousand to identify prime numbers could be split up into tasks by assigning a subset of the numbers to each available processor, and then combining the list of positive results back together. In this specification, the multiple processing devices that execute the individual tasks of a job are referred to as compute nodes.

Because a parallel computer may include thousands of compute nodes operating simultaneously, the parallel computer may consume a large amount of power. Electricity providers typically charge customers higher rates after the customer consumes an amount of power greater than a particular amount. Moreover, greater power consumption generally results in the compute nodes generating more heat. Sustained exposure to high heat may degrade the hardware elements in the parallel computing system and increase maintenance costs.

SUMMARY

Embodiments of the invention provide a method, system and computer program product for managing a parallel computing system that includes a plurality of compute nodes. The method, system and computer program product comprise monitoring a first parameter associated with at least one of the plurality of compute nodes, where the first parameter comprises at least one of: a measured temperature, a supplied current, and a measured power consumption, and where the plurality of compute nodes in the parallel computing system are coupled for data communications. Upon determining that the first parameter reaches or exceeds a first threshold for the first parameter, the method, system and computer program product transmit a global interrupt to at least two of the plurality of compute nodes that are configured to reduce power consumption upon receiving the global interrupt where the at least two compute nodes form an operational group that is a subset of the plurality of compute nodes. After transmitting the global interrupt, the method, system and computer program product determine whether second parameters respectively associated with each of the at least two compute nodes in the operational group reach or fall below a second threshold for the second parameters, where the second parameters comprise at least one of: a measured temperature, a supplied current, and a measured power consumption. After all the second parameters reach or fall below the second threshold, the method, system and computer program product cancel the global interrupt for the at least two compute nodes in the operational group.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
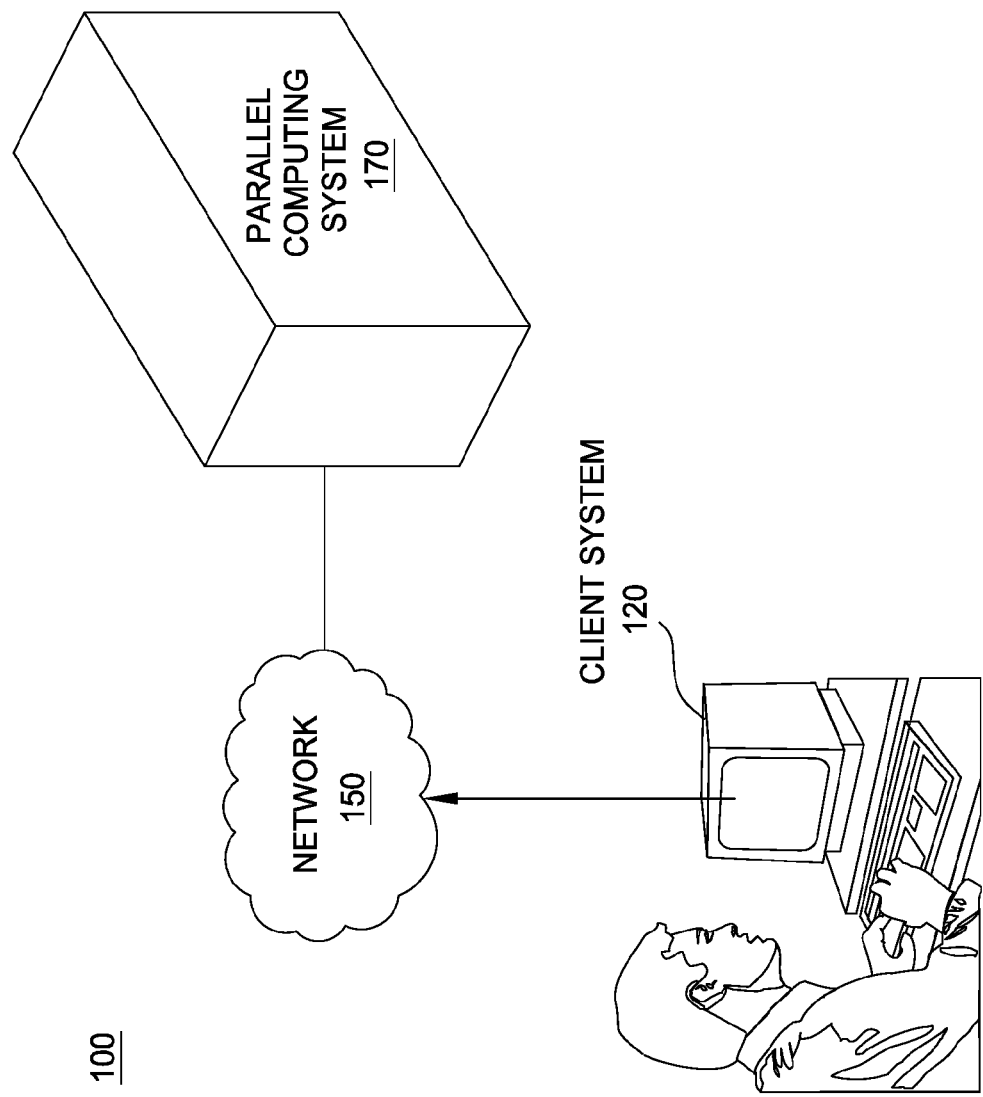
FIG. 1A-1C are diagrams illustrating a networked system for executing client submitted jobs on a parallel computing system, according to embodiments of the invention.

Parallel computing is a strategy for improving resource utilization on large numbers of computers, i.e., separate or distributed computers or compute nodes which collaborate to fulfill tasks. Parallel computing may focus on providing raw processing speed for computationally intensive problems (i.e., parallel processing). Because large parallel computing systems may have hundreds, if not thousands, of compute nodes in close proximity, the heat generated by the different hardware elements (e.g., processors, memory, controllers, etc.) may combine to reach levels that may be destructive to the hardware elements.

A parallel computing system may use power throttling to decrease the power consumed by the individual compute nodes, thereby slowing down or reversing the rate at which the temperature increases. In general, power throttling requires a compute node to idle for a certain portion of time; for example, a processor may pause for a millisecond at one second increments.

Compute nodes may be organized in groups based on whether they execute tasks associated with the same job. As long as a measured temperature, current, power consumption, etc. associated with one of the compute nodes in the group exceeds a first threshold, all of the nodes in the group may activate power throttling. For example, if one of these parameters is above the threshold, the associated compute node sends a global interrupt signal to the other compute nodes which triggers power throttling. To deactivate power throttling, at least two parameters associated with the compute nodes may be monitored to determine if they fall below a second threshold (e.g., a threshold that is lower than the first threshold). In one embodiment, the two parameters may be a first temperature measured on a first compute node and a second temperature measured on a second compute node. If both of these measured temperatures reach or fall below the second threshold, the global interrupt may be deactivated, thereby instructing all the compute nodes in the group to stop power throttling.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the user may transmit jobs to the cloud which are executed by a parallel computing system—i.e., by parallel computing. In such a case, the client system would send jobs to the parallel computing system and the results would be stored at a storage location in the cloud. Doing so allows a client system to access this information from any computing system attached to a network connected to the cloud (e.g., the Internet).

Figure 1B:
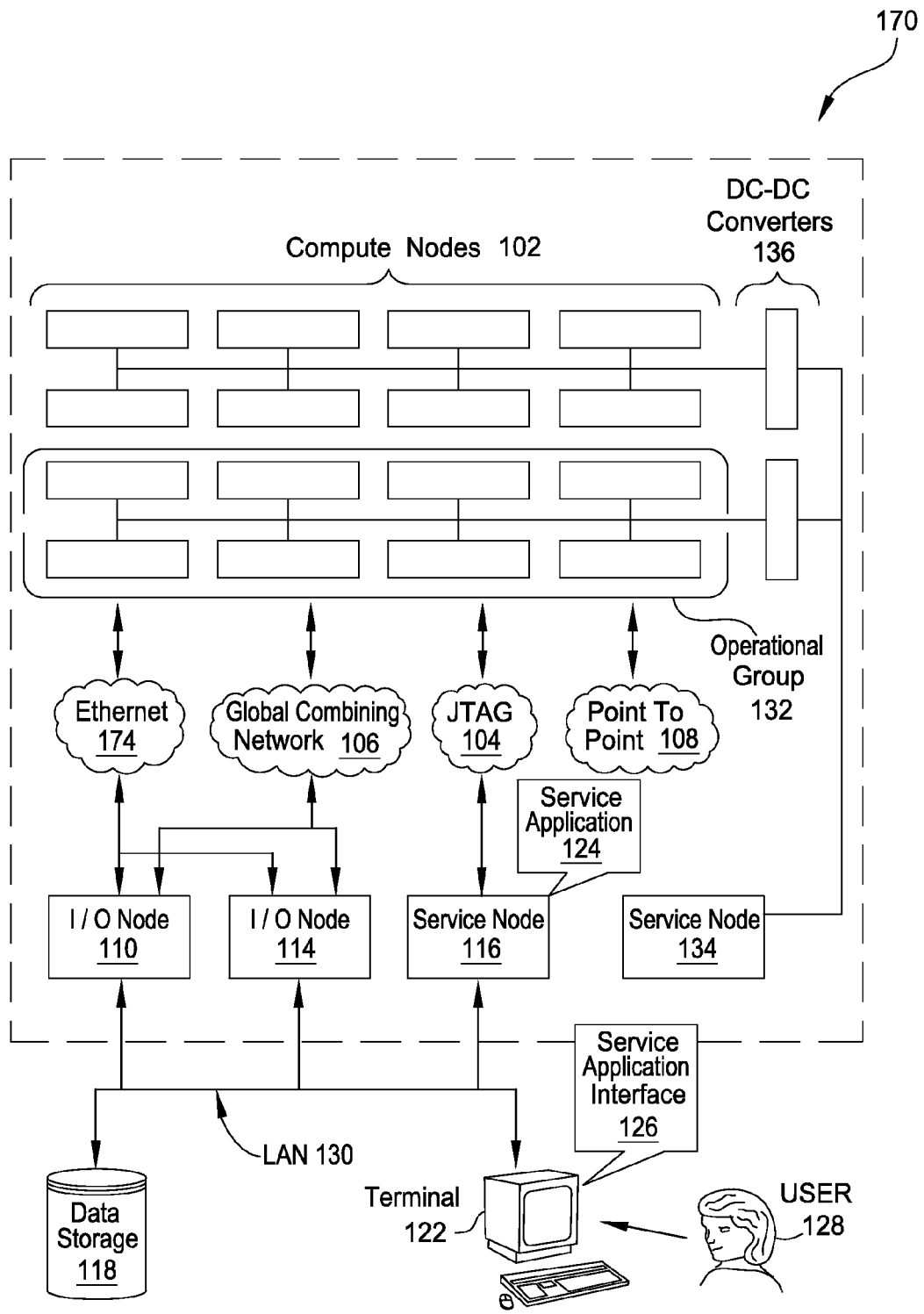
Figure 1C:
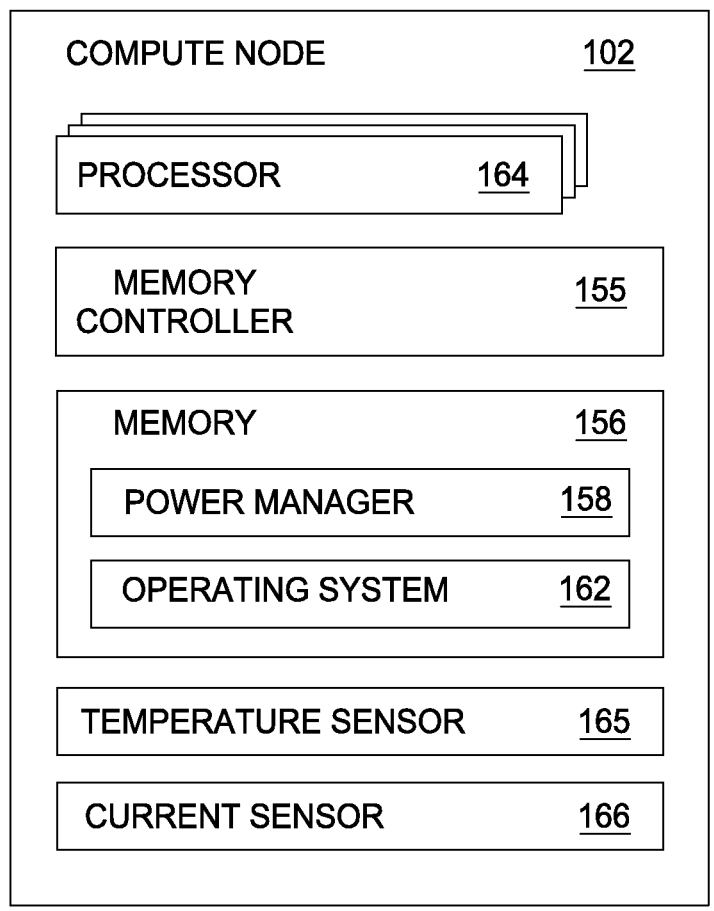

FIG. 1A-1C are diagrams illustrating a networked system for executing client submitted jobs on a parallel computing system, according to embodiments of the invention. As shown, FIG. 1A is a block diagram illustrating a networked system for performing client submitted jobs on a parallel computing system. In the depicted embodiment, the system 100 includes a client system 120 and a parallel computing system 170, connected by a network 150. Generally, the client system 120 submits jobs over the network 150 to a shared-file system running on the parallel computing system 170. Nonetheless, any requesting entity may transmit jobs to the parallel computing system 170. For example, software applications (such as an application running on the client system 120), operating systems, sub-systems, other parallel computing systems 170 and, at the highest level, users may submit jobs. The term "job" denotes a set of commands for requesting resources from the parallel computing system 170 and using these resources. Any object oriented programming language such as Java, Smalltalk, C++ or the like may be implemented to format the set of commands. Additionally, a parallel computing system 170 may implement a unique programming language or provide a particular template. These jobs may be predefined (i.e., hard coded as part of an application) or may be generated in response to input (e.g., user input). Upon receiving the job, the parallel computing system 170 executes the request and then returns the result.

FIG. 1B illustrates an exemplary system for managing power in the parallel computing system. The parallel computing system 170 includes non-volatile memory for the computer in the form of data storage device 118 and an input/output device for the system 170 in the form of computer terminal 122. Parallel computing system 170 also includes a plurality of compute nodes 102—i.e., the system 170 is a multi-nodal system. One or more of the compute nodes 102 may be located in an individual chassis.

The compute nodes 102 are coupled for data communications by several independent data communications networks including a high speed Ethernet network 174, a Joint Test Action Group (JTAG) network 104, a global combining network 106 which is optimized for collective operations, and a point-to-point torus network 108. The global combining network 106 is a data communications network that includes data communications links connected to the compute nodes 102 to organize the compute nodes 102 in a tree structure. Each data communications network is implemented with data communications links between the compute nodes 102 to enable parallel operations among the compute nodes 102.

In addition, at least two of the compute nodes 102 are organized into at least one operational group 132 of compute nodes 102. An operational group 132 may be a subset of all the compute nodes 102 and I/O nodes 110, 114 in the parallel computing system 170 that participate in carrying out a job. In one embodiment, compute nodes 102 may be organized into an operational group 132 based on whether they execute at least one task from the same job. However, the compute nodes 102 may be grouped in the same operational group 132 as compute nodes 102 that also execute tasks from other jobs. Accordingly, a compute node 102 may be included in one or more groups 132 if it executes tasks associated with two different jobs.

Collective operations may be implemented with data communications among the compute nodes 102 of an operational group 132. Collective operations are those functions that involve all the compute nodes 102 of an operational group 132. A collective operation may be a message-passing instruction that is executed at approximately the same time by all the compute nodes 102 in an operational group 132. Further, collective operations are often built around point to point operations—e.g., a torus configuration. A collective operation requires that all processes on all compute nodes within an operational group call the same collective operation with matching arguments. A "broadcast" is a collective operation for moving data among compute nodes of an operational group. A "reduce" operation is a collective operation that executes arithmetic or logical functions on data distributed among the compute nodes of an operational group. An operational group may be implemented as, for example, an MPI communicator. A more detailed discussion of different types of collective operations may be found in "MANAGING POWER IN A PARALLEL COMPUTER" Gara et al. U.S. Pat. No. 7,877,620 which is herein incorporated by reference.

In addition to compute nodes 102, the parallel computing system 170 includes input/output (I/O) nodes 110, 114 coupled to compute nodes 102 through one of the data communications networks 174, 106. The I/O nodes 110, 114 provide I/O services between compute nodes 102 and I/O devices 118, 122 using local area network (LAN) 130. The parallel computing system 170 also includes a service node 116 coupled to the compute nodes 102 through one of the networks 104. Service node 116 provides service common to pluralities of compute nodes 102, loading programs into the compute nodes 102, starting program execution on the compute nodes 102, retrieving results of program operations on the computer nodes 102, and so on. Service node 116 runs a service application 124 and communicates with users 128 through a service application interface 126 that executes on computer terminal 122. In one embodiment, however, the service application interface 126 may execute on the client system 120 and communicates with the service node 116 via the network 150.

A power supply 134 powers the compute nodes 102 through a plurality of direct current to direct current (DC-DC) converters 136. Each DC-DC converter 136 may include one or more current sensors and/or temperature sensors. In one embodiment, each DC-DC converter 136 supplies current to an assigned operational group 132. Although each DC-DC converter 136 in the system is depicted as supplying current to eight compute nodes 102, a person skilled in the art will recognize that DC-DC converters 136 may supply current to an assigned group comprising any number of compute nodes 102.

Although not shown, an operation group 132 may include compute nodes 102 that span different servers, DC-DC converters 136, or chassis (i.e., a container that encloses a plurality of server boards). Thus, the same DC-DC converter 136 may not provide power to every compute node 102 in an operational group 132.

There are two primary ways compute nodes 102 may communicate: shared memory or message passing. Shared memory processing needs additional locking for the data and imposes the overhead of additional processor and bus cycles. Message passing uses high-speed data communications networks and message buffers, but this communication method adds overhead on the data communications networks as well as additional memory for message buffers.

Many different data communications network architectures may be used for message passing among nodes in parallel computers. Compute nodes 102 may be organized in a network as a "torus" or "mesh", for example. Also, compute nodes 102 may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

Figure 2:
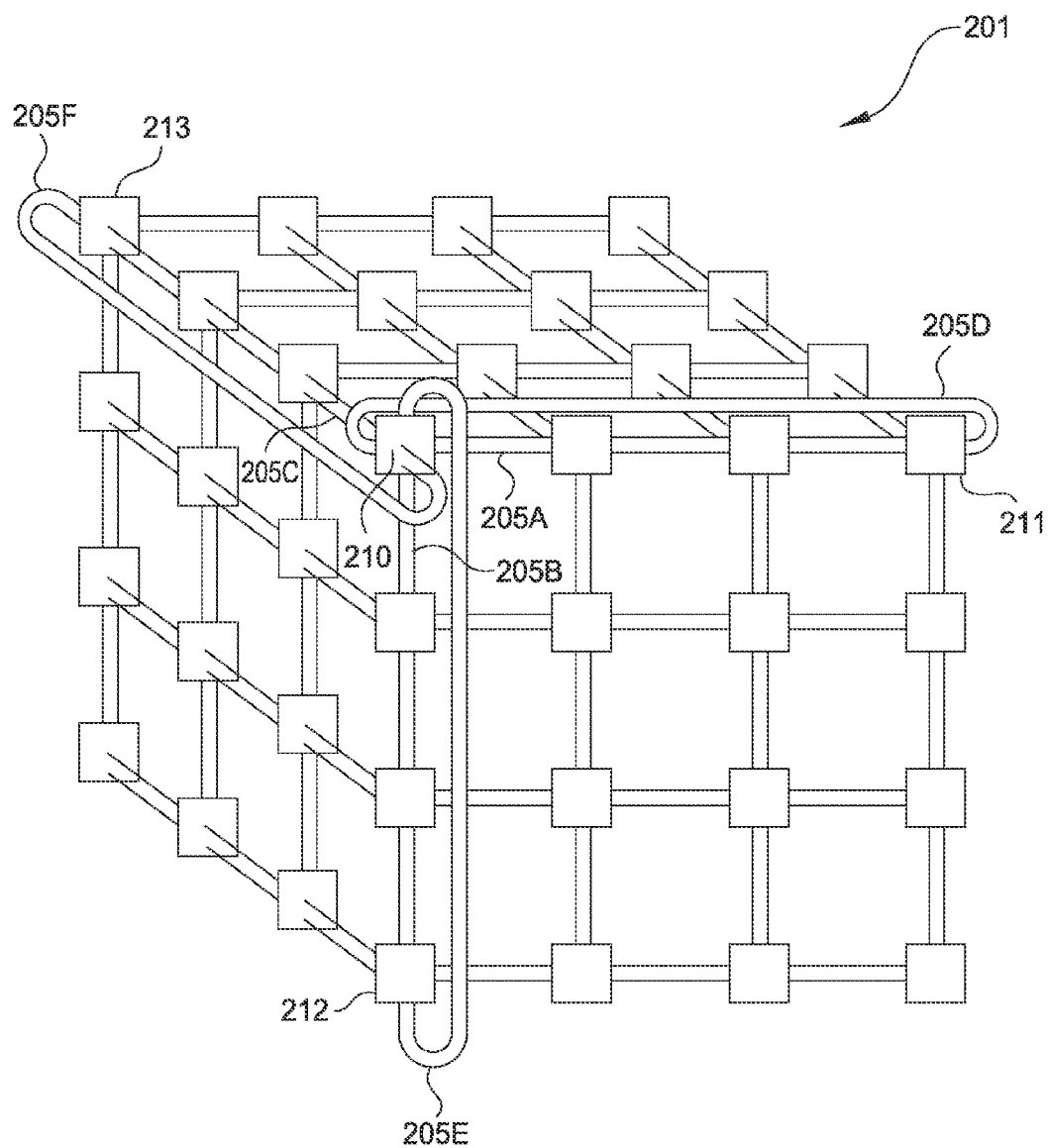
FIG. 2 illustrates a 4×4×4 torus of compute nodes in the parallel computing system, according to one embodiment of the invention.

FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger, for instance, a Blue Gene/L system includes 65,536 compute nodes. Each compute node in the torus 201 includes a set of six node-to-node communication links 205A-F which allow each compute node in the torus 201 to communicate with its six immediate neighbors, two nodes in each of the x, y and z coordinate dimensions. In one embodiment, the parallel computing system 170 may establish a separate torus network for each job executing in the system 170. Alternatively, all the compute nodes 102 may be connected to form one torus.

As used herein, the term "torus" includes any regular pattern of nodes and inter-nodal data communications paths in more than one dimension such that each node has a defined set of neighbors, and for any given node, it is possible to determine the set of neighbors of that node. A "neighbor" of a given node is any node which is linked to the given node by a direct inter-nodal data communications path—i.e., a path which does not have to traverse through another node. The compute nodes may be linked in a three-dimensional torus 201, as shown in FIG. 2, but may also be configured to have more or fewer dimensions. Also, it is not necessary that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 2 by links 205D, 205E and 205F which wrap around from a last node in the x, y and z dimensions to a first node. Thus, although node 210 appears to be at a "corner" of the torus, node-to-node links 205A-F link node 210 to nodes 211, 212 and 213, in the x, y and z dimensions of torus 201.

FIG. 1C is a block diagram of a compute node configured to execute tasks in the parallel computing system of FIG. 1B, according to one embodiment of the invention. As shown, the compute node 102 contains a computer processor 164, memory 156, a temperature sensor 165 and current sensor 166. The computer processor 164 may be any processor capable of performing the functions described herein. Moreover, the processor 164 may represent a plurality of processors 164 or processor(s) that are multi-core.

Memory 156 contains an operating system 162 and a power manager 158. Although memory 156 is shown as a single entity, the memory 156 may include one or more memory devices having blocks of memory associated with physical addresses, such as random access memory (RAM), read only memory (ROM), flash memory or other types of volatile and/or non-volatile memory. The operating system 162 may be any operating system capable of performing the functions described herein.

The power manager 158 may be tasked with managing the power consumption of the compute node 102. For example, the power manager 158 may receive temperature readings from the temperature sensor 165 or current readings from the current sensor 166. Moreover, the power manager 158 may transmit global interrupts to other compute nodes 102 within the parallel computing system 170 when the power consumption or temperature of the node 102 exceeds a threshold. In one embodiment, the global interrupt is sent to only the compute nodes 102 in the node's operational group 132—e.g., the nodes 102 that are executing tasks of the same job. Each power manager 158 of the compute nodes 102 within the operational group 132 may be configured to receive the global interrupt from the other power managers 158.

As used herein a "global interrupt" instructs a compute node 102 to reduce its power consumption, and thus, its operational temperature. Specifically, the global interrupt may cause some particular hardware element or combination of elements of the compute node 102 to reduce its power consumption. In one embodiment, once the power manager 158 transmits a global interrupt, all the respective power managers 158 instruct, for example, a memory controller 155 to idle after a certain number of memory accesses—i.e., insert a delay. Any applications attempting to access data stored in the memory 156 would then have to wait for the delay to end. Additionally or alternatively, the power managers 158 may instruct a processor 164 to idle, for example, by inserting NOPs into the pipeline of the processor 164 or inserting a wait instruction that forces the processor 164 to idle until a different instruction is received which informs the processor 164 to resume. Any of these examples may decrease the power consumed by the compute node 102, and thereby reduce the operational temperature of the node 102. Reducing the temperature may lessen the wear-and-tear on the hardware elements in the parallel processing system 170.

In one embodiment, the power manager 158 may instruct the memory controller 155 or processor 164 to idle for a certain portion of a defined time period—i.e., the hardware elements idle repeatedly rather than only once. For example, the power manager 158 may instruct the processor 164 to idle for 1 millisecond for every second of execution time—i.e., idle 0.1% of the time. This is referred to as "power throttling" and may be maintained for as long as the global interrupt is active. Moreover, the idle time may be performed at the same time within the defined time period—e.g., the processor idles for 1 ms, executes instructions for 999 ms before idling for another 1 ms and executing instructions for 999 ms. Alternatively, the hardware element may randomly idle at different times within the defined time period—e.g., where the defined time period is 1 second, the processor 164 executes instructions for 100 ms, idles for 1 ms, executes instructions for 899 ms, idles 1 ms, and executes instructions for 999 ms. Advantageously, causing a hardware element or a combination of hardware elements of the compute node 102 to reduce power consumption at a predefined ratio may reduce the temperature of the parallel computing system 170 yet still allow the compute nodes 102 to execute the tasks.

In one embodiment, temperature sensors may be located throughout the compute nodes 102 or the parallel computing system 170. For example, a temperature sensor may directly contact the die of the processor 164, be disposed near a fan on the compute node 102, or mounted on a PCB board that holds the different hardware elements of the compute node 102. Additionally, the power manager 158 may monitor sensors that are not directly connected to the compute node 102. For example, a plurality of temperature sensors may be located in the same chassis as the compute node 102 to monitor the temperature of the air flowing between the compute nodes 102 in the chassis.

Similarly, the current sensors 166 may be located at different places in the parallel computing system 170 to monitor the power supplied to one or more of the compute nodes 102.

Triggering the Global Interrupt Signal

Figure 3A:
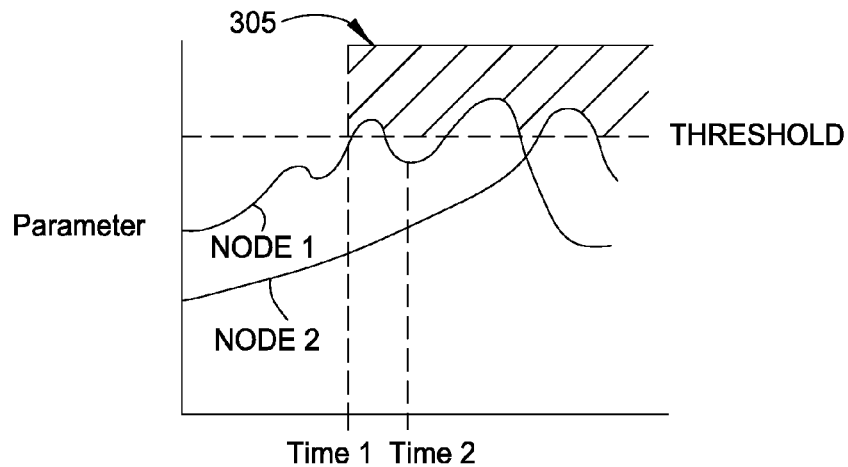
FIGS. 3A-3C are graphs that illustrate activating power throttling using a first threshold, according to embodiments of the invention.
Figure 3B:
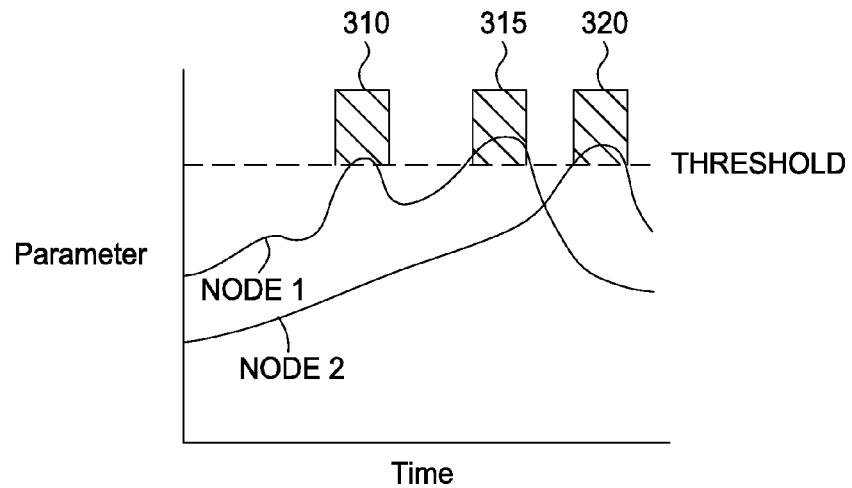
Figure 3C:
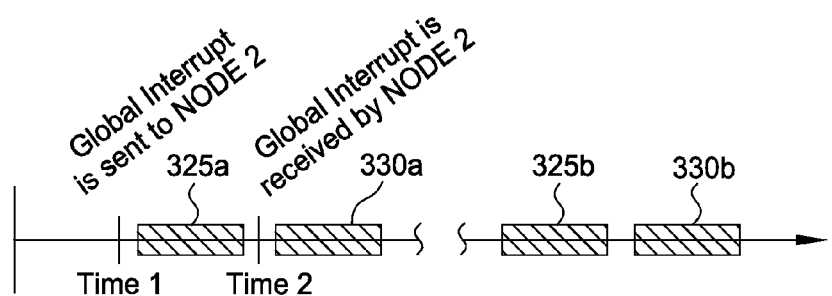

FIGS. 3A-3C are graphs that illustrate activating power throttling using a first threshold, according to embodiments of the invention. As shown, FIG. 3A plots parameters that are measured on both Node 1 and 2 versus time. The parameters may be temperature readings from temperature sensors 164 located on the respective nodes, current readings from current sensors 166 located on the respective nodes, power consumption that may be derived from the current measurements and/or temperature readings, or combinations thereof. If a compute node 102 draws more power, it is likely to generate more heat. Data may be gathered that correlates a particular current reading or power consumption value to a resulting temperature. Accordingly, Node 1 may directly measure the temperature while Node 2 may measure a current. Nonetheless, the current measurements may be correlated to temperature measurements and be compared to the same threshold.

Additionally, the parameter may be a combination of different types of measurements (temperature, current, power, etc.) or a combination of measurements from different sensors of the same type. For example, the Node 1 may have a temperature sensor located on the PCB board near a fan and one located on the chip of the processor 164. The power manager 158 may take, for example, a weighted average of the two different measurements to derive a single parameter associated with Node 1. Alternatively, the current readings from the current sensor 166 may be correlated to temperature readings which are then averaged with temperature readings from the temperature sensor 165 to yield the parameter. One of ordinary skill in the art will recognize the different ways of combining readings from different types of sensors to monitor the temperature or power consumption of a system.

In the embodiment shown in FIG. 3A, the global interrupt signal is triggered for all the nodes in a same group when the measured parameter associated with any of the nodes exceeds the predefined threshold. For example, each node in a group may wait until it detects that its parameter is above the threshold or until it receives a global interrupt signal from any of the compute nodes 102 in the operational group 132 before activating power throttling. Shaded region 305 defines the length of time, starting at Time 1, that power throttling may be active on all of the nodes—i.e., Node 1 and Node 2—in the same operational group 132. For example, both of the power managers 158 associated with Node 1 and 2 may instruct the processors 164 to idle 1% of the time when power throttling is active. Moreover, in the embodiment illustrated in FIG. 3A, the global interrupt remains active even if the measured parameters for both Node 1 and 2 fall below the threshold—i.e., at Time 2. For example, the parallel computing system 170 may assume that the current job is computational extensive such that once power throttling is activated on all the nodes by a global interrupt, it remains active until the job completes.

In contrast, FIG. 3B illustrates a graph where power throttling is active only when the parameter for at least one of the nodes exceeds the threshold—i.e., regions 310, 315, and 320. Accordingly, a node does not transmit a global interrupt if the parameter falls below Threshold 1. As long as neither Node 1 nor 2 transmits a global interrupt, then power throttling is deactivated. However, this approach may force Node 1 and 2 to constantly switch between activating and deactivating power throttling which may increase messages transmitted between the nodes and ultimately cause the job to execute slower than if power throttling remained active the for the entire duration as shown in FIG. 3A.

Alternatively, although not shown, the global interrupt can be triggered by a parameter is that is associated with a plurality of the compute nodes 102 rather than only one compute node 102. For example, the current sensor located on the DC-DC converter 136 may be monitored to determine when to activate power throttling even though the parameter is not associated with one particular compute node 102 but with an operational group 132.

Synchronizing Power Throttling

Power throttling may be synchronized across the group of nodes to reduce OS noise or jitter. Because power throttling may be activated for all the nodes 102 in an operational group 132 when any of the nodes 102 have a parameter that exceeds the threshold, power throttling may be synchronized such that the compute nodes 102 in the group are idle simultaneously.

In one embodiment, each of the compute nodes 102 may receive a global clock signal that informs each compute node 102 of the global time for the parallel computing system 170. The signal may be used to synchronize when the compute nodes 102 (or a hardware element on the compute nodes 102) idle.

FIG. 3C is a timeline that may cause OS noise, according to one embodiment of the invention. At Time 1, Node 1 determines its parameter exceeds the threshold and transmits a global interrupt to Node 2 which instructs the power manager 158 on Node 2 to activate power throttling. Because there may be a delay by the time the global interrupt signal reaches Node 2, Node 1 may have already begun to idle its processor 164 to reduce power consumption as shown by region 325a. At Time 2, Node 2 receives the interrupt and begins power throttling, however, it idles at a different time than Node 1 as shown by region 330a. Because the time needed for the global interrupt to reach each node in the operational group 132 may vary, the nodes may idle at different times. Once it is time to again idle, region 325b illustrates that again Node 1 idles at a different time than Node 2—i.e., region 330b.

However, compute nodes 102 in an operational group 132 may execute tasks associated with the same job. In many cases, this requires the nodes 102 to constantly communicate with each other. If, for example, Node 2 is waiting for a certain result from Node 1 at Time 1 but Node 1 is idling, Node 2 must wait until Node 1 is no longer idling. However, before Node 1 can stop idling and transmit the results to Node 2, Node 2 may receive the global interrupt and begin to idle (i.e., region 330a). Only after Node 2 stops idling will it be able to process the results transmitted from Node 1. As shown by this simplistic example, without synchronization, it is possible for a 10% idle time to be effectively doubled to a 20% idle time. That is, because Node 2 was dependent on data from Node 1, it had to wait double the idle time to receive the data. Of course, the idle time could be shrunk by half, but this may not work where there are more than two compute nodes 102 in an operational group 132 or where the rate at which the global interrupt propagates through the system 170 various.

Instead, the power manager 158 on each compute node 102 may synchronize the idle times of the power throttling using the global clock. Once a power manager 158 receives a global interrupt, it may wait to idle a hardware element in the compute node 102 until a predefined time. The power manager 158 may wait until the beginning of a new second to idle—e.g., the processor 164 is idle for 1 millisecond each time the global clock counts a new second. All of the power managers 158 in the operational group may similarly wait until the beginning of a new second to idle the processors. In this manner, OS noise may be lessened and an administrator may be confident that the compute nodes 102 are idle for only the percentage defined by power throttling. Stated differently, synchronizing the power throttling causes no additional latency between the compute nodes 102 in an operational group 132, even if there are data dependencies.

Intelligently Deactivating Power Throttling

Figure 4A:
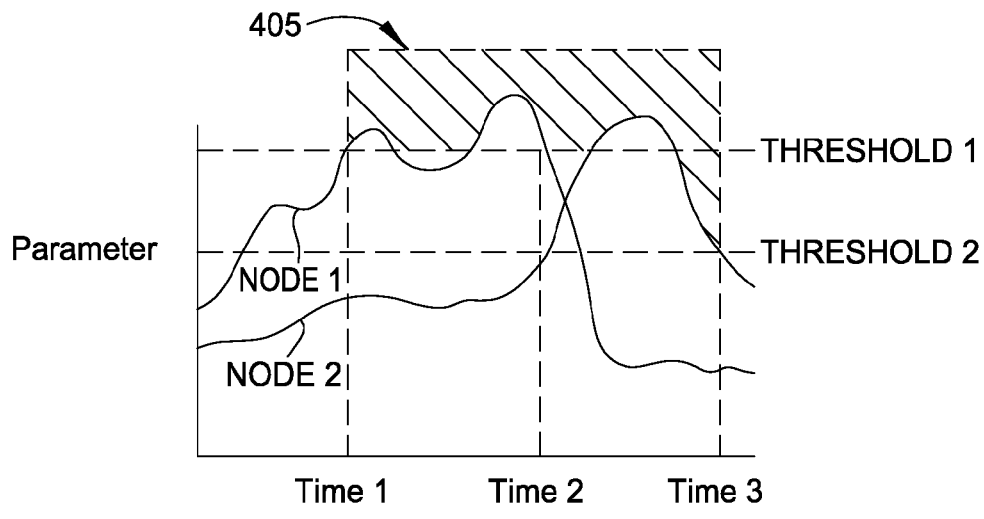
FIGS. 4A-4B illustrate deactivating power throttling using a second threshold, according to embodiments of the invention.
Figure 4B:
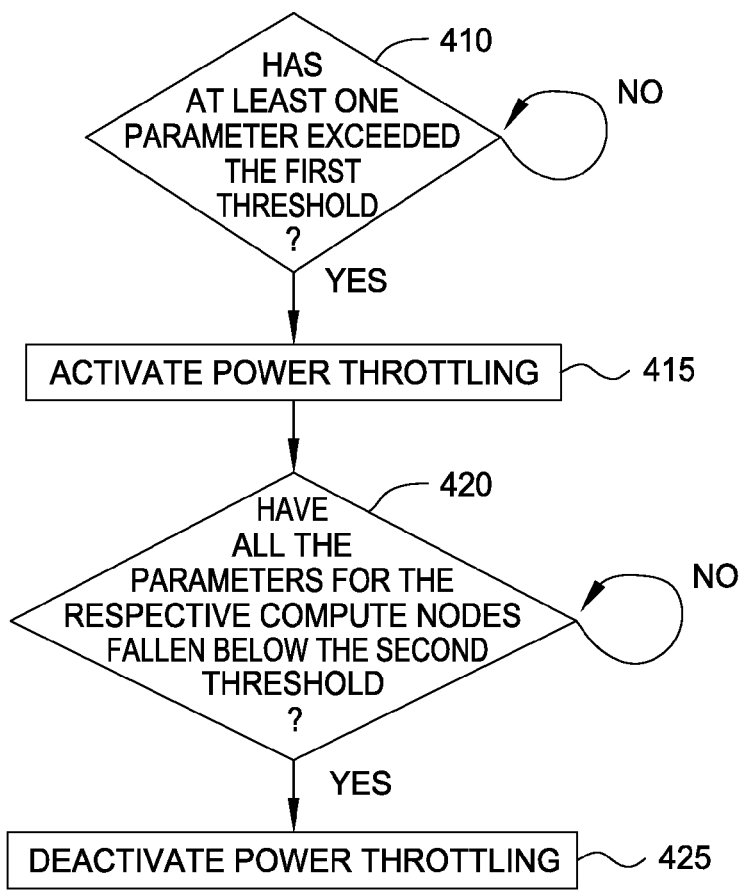

FIGS. 4A-4B illustrate deactivating power throttling using two thresholds, according to embodiments of the invention. Similar to FIG. 3A, FIG. 4A is a graph that indicates a region 405 where power throttling is activated for Nodes 1 and 2. FIG. 4B is a technique for determining when to activate and deactivate power throttling. At step 410, the power managers 158 of the respective compute nodes 102 may monitor a defined parameter (e.g., temperature, current, power, or combinations thereof) to determine whether it meets or exceeds a first threshold. The first threshold represents the maximum desired value of the parameter. For example, a system administrator may not want the temperature to exceed 80 degrees Celsius since prolonged exposure to that temperature causes the hardware elements in the parallel computing system 170 to deteriorate.

Additionally, the first threshold may be exceeded by a parameter that is associated with a parameter that is common to a plurality of compute nodes 102 such as the current measured by a current sensor of the DC-DC converter 136. In this case, all of the compute nodes 102 associated with the parameter—i.e., all the compute nodes 102 that receive power from the DC-DC converter 136—may receive a global interrupt and begin power throttling.

At step 415, once any parameter meets or exceeds Threshold 1, the active throttling is activated for one or more compute nodes 102. In one embodiment, the power throttling is activated for at least two compute nodes 102 that make up an operational group 132—i.e., compute nodes 102 that are executing tasks that are part of the same job.

Unlike in FIG. 3A, the power throttling may be disabled before the compute nodes 102 finish executing their tasks. For example, the compute nodes 102 may be executing a short piece of code that is particularly computational intensive. As shown in FIG. 4A, the parameter (e.g., temperature) may rise as Nodes 1 and 2 begin executing the code. Accordingly, power throttling is activated at Time 1 when the temperature of Node 1 rises above Threshold 1. At Time 2, Node 1 may have finished executing and, with the aid of power throttling, its temperature quickly decreases. However, Node 2 may, for example, receive the results from Node 1 and begin to perform a different process which causes its temperature to remain above Threshold 2. Not until Time 3 do the parameters for Node 1 and 2 meet or fall below Threshold 2 and power throttling for the two nodes is deactivated.

Accordingly, at step 420, power throttling remains active until all of the parameters associated with the compute nodes 102 with power throttling activated have meet or fallen below a second threshold that is lower than the first threshold. If that criterion is satisfied, at step 425 power throttling is deactivated. In one embodiment, each of the nodes may transmit the global interrupt so long as an associated parameter is above the second threshold. Thus, each compute node 102 may wait until it does not receive any global interrupts before deactivating power throttling.

In one embodiment, each compute node 102 in an operational group 132 may have a parameter associated with one or more sensors physically located on the node 102. To deactivate power throttling, each of the parameters associated with a respective compute node 102 must meet of fall below the second threshold.

In one embodiment, the parameter measured to determine whether the first threshold is met may be different than a parameter used to determine if the second threshold is met. For example, the current measured by the current sensors 166 may be used to determine if the first threshold is met but the measured temperature from the temperature sensors 165 may be monitored to determine if the second threshold is met. That is, once the power manager 158 receives a global interrupt it may stop monitoring current and start monitoring temperature to determine if it has fallen below a second threshold. In this case, the first threshold would not be "below" the second threshold since the first threshold may correspond to a current value while the second threshold is a temperature value. Nonetheless, because of the relationship between current (i.e., power consumed) and temperature, using thresholds based on two different types of parameters is feasible.

Similarly, the current measured by the DC-DC converter 136 may be monitored to activate power throttling but the current sensors 166 on the respective compute nodes 102 may be monitored to determine if power throttling should be deactivated. That is, in this embodiment, before power throttling is deactivated, parameters measured by a sensor located on each of the compute nodes 102 in the operational group must meet or be below the second threshold.

In one embodiment, instead of one of the parameters used for deactivating power throttling being associated with a particular compute node 102, the parameter may be associated with a subset of the compute nodes 102 in the operational group 132. For example, if one temperature sensor was proximate to half of the compute nodes 102 in an operational group 132 and a second temperature sensor was proximate to the other half, the temperature measurements for these sensors may be used to deactivate the power throttling for all the compute nodes 102 in the operational group. Accordingly, if both of the temperature sensors report a temperature below the second threshold, the respective power managers 158 would deactivate power throttling.

Figure 5:
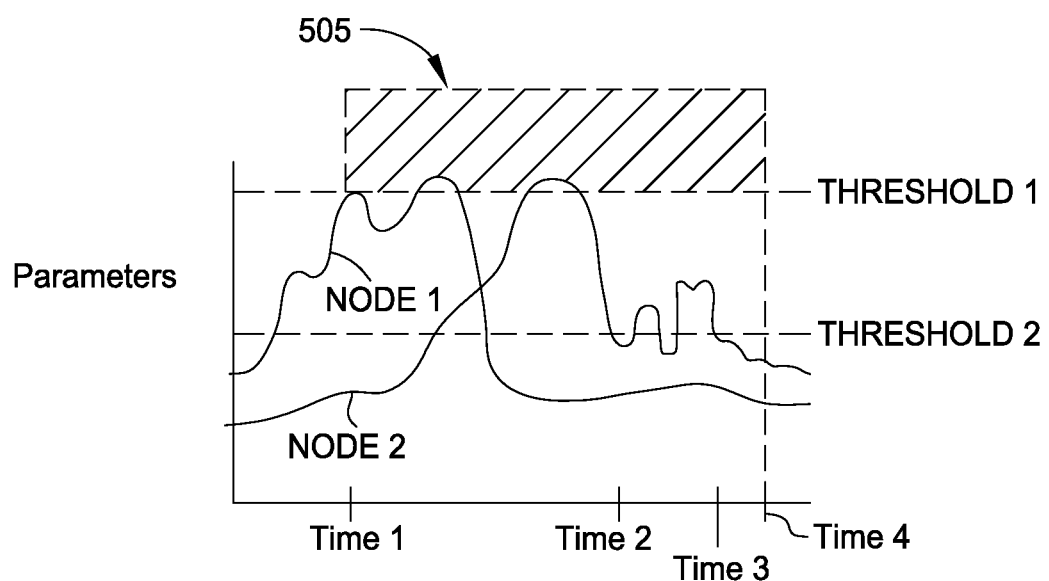
FIG. 5 is a graph illustrating a technique of considering debounce when deactivating power throttling, according to one embodiment of the invention.

FIG. 5 is a graph illustrating deactivating power throttling for a plurality of compute nodes, according to one embodiment of the invention. As shown, the power managers 158 may not immediately deactivate power throttling when all the parameters are below the second threshold. Instead, the power managers 158 may delay deactivating the power throttling to account for debouncing. "Debouncing" is instability in a parameter's rate of change—i.e., the parameter switches between a negative and positive slope. FIG. 5 illustrates that the parameter of Node 2 remains close to Threshold 2 from Time 2 to Time 4. Accordingly, the power managers 158 may be configured to not deactivate power throttling until all of the parameters are below the second threshold for "n" number of readings, where n is greater than one. For example, if the parameter values are measured every millisecond, the power manager 158 may wait until all the measured parameter values are below the second threshold for n milliseconds. At Time 2 all of the parameters are below the second threshold, however, before the n number of readings is reached, the parameter for Node 2 exceeds the threshold. At Time 3, the parameter again drops below the second threshold but this time remains below the threshold until Time 4 when n number of readings below Threshold 2 has been obtained. Accordingly, as shown by region 505, the power managers 158 deactivate power throttling for both Nodes 1 and 2 (i.e., the operational group 132) at Time 4.

CONCLUSION

Power throttling may be used to conserve power and reduce heat in a parallel computing environment. Compute nodes in the parallel computing environment may be organized into groups based on, for example, whether they execute tasks of the same job or receive power from the same power converter. Once one of compute nodes in the group detects that a parameter (i.e., temperature, current, power consumption, etc.) has exceeded a first threshold, power throttling on all the nodes in the group may be activated. However, before deactivating power throttling, a plurality of parameters associated with the group of compute nodes may be monitored to ensure they are all below a second threshold. If so, power throttling for all of the compute nodes is deactivated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing a parallel computing system that comprises a plurality of compute nodes, comprising:
monitoring a first parameter of a first one of the plurality of compute nodes, wherein the first parameter comprises at least one of: a measured temperature, a measured current, and a measured power consumption, and wherein the plurality of compute nodes in the parallel computing system are coupled for data communications;
upon determining that the first parameter reaches or exceeds a first threshold for the first parameter, transmitting a global interrupt to at least two of the plurality of compute nodes that are configured to reduce power consumption upon receiving the global interrupt, wherein the at least two compute nodes comprises the first one of the plurality of compute nodes, and wherein the at least two compute nodes form an operational group that is a subset of the plurality of compute nodes;
after transmitting the global interrupt, determining whether second parameters of each of the at least two compute nodes in the operational group reach or fall below a second threshold for the second parameters, wherein the second parameters comprise at least one of: a measured temperature, a measured current, and a measured power consumption; and
only after all the second parameters are at or below the second threshold, cancelling the global interrupt for the at least two compute nodes in the operational group.

2. The method of claim 1, wherein each of the at least two compute nodes in the operational group execute a task associated with the same job that is performed by the parallel computing system, wherein a job comprises a plurality of tasks.

3. The method of claim 1, wherein the first parameter is one of the second parameters.

4. The method of claim 3, wherein the first threshold is a maximum desired value of the first parameter and wherein the second threshold corresponds to a value that is less than the maximum desired value.

5. The method of claim 1, wherein the global interrupt is synchronized across the at least two compute nodes via a global clock signal shared between the compute nodes in the operational group such that a hardware element on each of the at least two compute nodes in the operational group idle simultaneously.

6. The method of claim 5, wherein the hardware element is one of a processor and a memory controller.

7. The method of claim 1, further comprising:
before transmitting the signal that cancels the global interrupt, determining that all the second parameters reach or fall below the second threshold for a plurality of readings measured at sequential times.

8. The method of claim 1, wherein the plurality of compute nodes are distributed in a plurality of chassis, wherein each chassis is associated with a separate DC power supply.

9. The computer implemented method of claim 1, further comprising providing a global clock signal that informs each of the compute nodes of the global time for the parallel computing system, wherein the global interrupt includes a predefined time, wherein the at least two of the plurality of compute nodes are configured to reduce power consumption upon the global time matching the predefined time of the global interrupt.

10. A computer-implemented method of managing a parallel computing system that comprises a first compute node and a second compute node, comprising:
monitoring a first parameter of the first compute node and the first parameter of the second compute node, wherein the first parameter comprises at least one of: a measured temperature, a measured current, and a measured power consumption, and wherein the plurality of compute nodes in the parallel computing system are coupled for data communications;
upon determining that one of the first parameter of the first compute node and the first parameter of the second compute node reaches or exceeds a first threshold for the first parameter, transmitting a global interrupt to the first and second compute nodes that are configured to reduce power consumption upon receiving the global interrupt, wherein the at least two compute nodes form an operational group that is a subset of the plurality of compute nodes;

after transmitting the global interrupt, determining whether a second parameter of the first compute node and the second parameter of the second compute node falls below a second threshold for the second parameter, wherein the second parameter comprises at least one of: a measured temperature, a measured current, and a measured power consumption; and only after both the second parameter of the first compute node and the second parameter of the second compute node is at or below the second threshold, cancelling the global interrupt for both the first compute node and the second compute node.

\* \* \* \* \*